June 26, 1951 — P. M. MORROW — 2,558,311
TRAILER AXLE AND WHEEL SPRING SUSPENSION
Filed Oct. 19, 1948 — 2 Sheets-Sheet 1
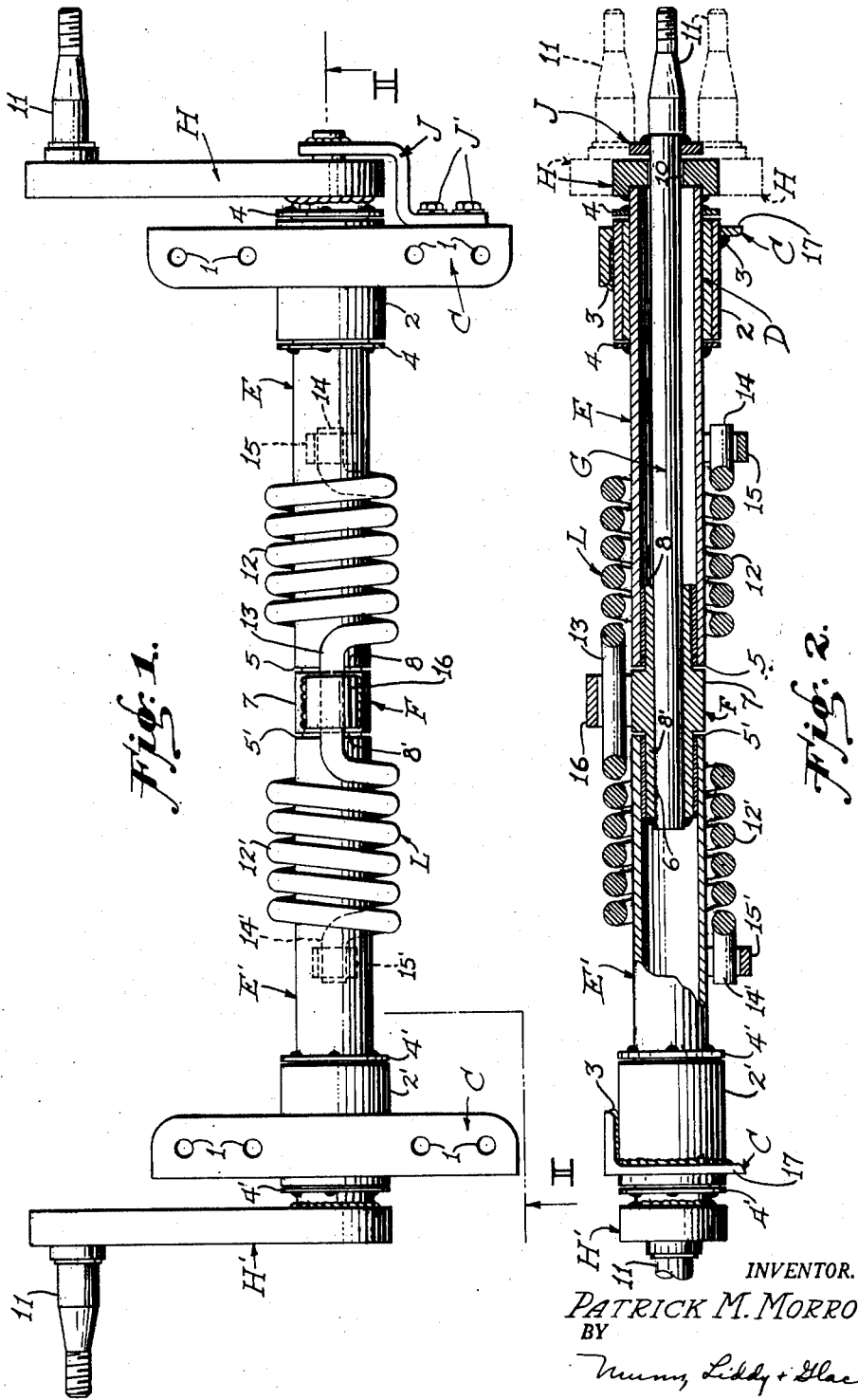
INVENTOR.
PATRICK M. MORROW
BY
ATTORNEYS INVENTOR.
PATRICK M. MORROW
BY
Munn, Liddy & Glascum
ATTORNEYS Patented June 26, 1951

2,558,311

UNITED STATES PATENT OFFICE 2,558,311

TRAILER AXLE AND WHEEL SPRING SUSPENSION

Patrick M. Morrow, San Francisco, Calif.

Application October 19, 1948, Serial No. 55,278

5 Claims. (Cl. 267—20)

The present invention relates to improvements in a trailer axle and wheel spring suspension. It consists of the combinations, constructions and arrangements of parts as hereinafter described and claimed.

An object of my invention is to provide a trailer axle and wheel spring suspension in which each wheel on the axle is provided with a separate spring support which includes a torsional spring that encloses a portion of the axle.

A further object of my invention is to provide a device of the type described in which an overload torque spring, connected to both spring supports for the wheels, automatically comes into play when the load on either separate spring support exceeds a predetermined amount.

A further object of my invention is to provide a device of the type described in which the distance between the trailer body and the ground can be altered within certain limits. The altering of the trailer body position with respect to the ground will also vary the initial force which each torsional spring will absorb from each wheel.

The device is simple in construction and is durable and efficient for the purpose intended. There is a direct saving in steel because fewer parts are necessary. Each wheel has individual spring suspension and independent knee action.

Other objects and advantages will appear in the following specification, and the novel features of the device will be particularly pointed out in the appended claims.

My invention is illustrated in the accompanying drawing forming a part of this application, in which:

Figure 1 is a top plan view of the device;

Figure 2 is a section along the line II—II of Figure 1;

Figure 3:
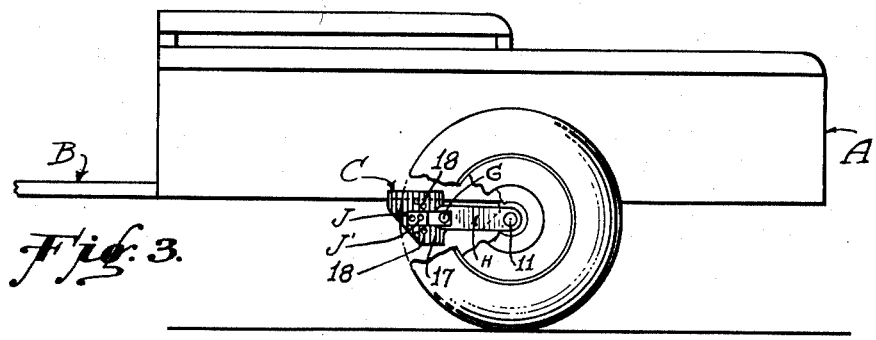
Figure 3 is a side elevation of a trailer showing my device operatively applied thereto.
Figure 4:
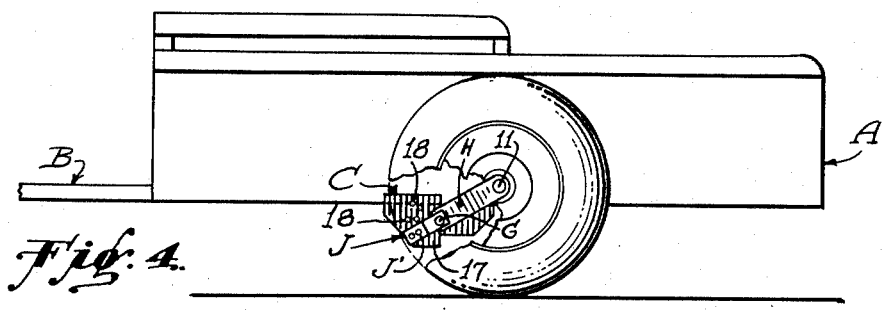
Figure 5:
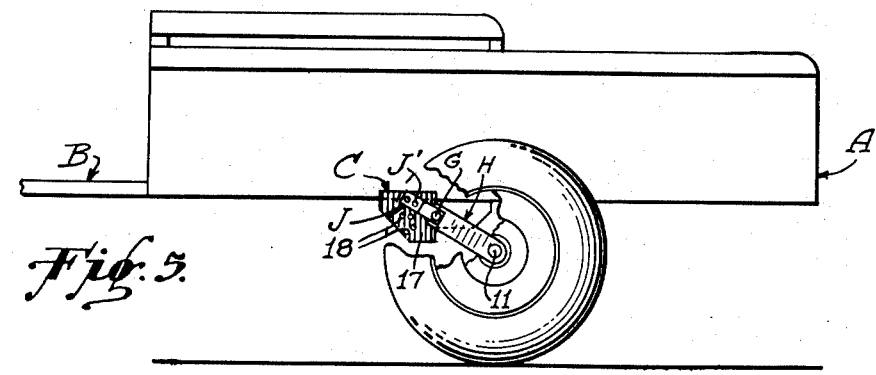

Figure 4 is a view similar to Figure 3, but shows the overload spring anchor connected to the body bracket at an upwardly inclined angle so as to lower the trailer body with respect to the ground from that shown in Figure 3; and Figure 5 is a view showing the overload spring anchor connected to the body bracket at a downwardly inclined angle so as to raise the trailer body with respect to the ground from that shown in Figure 3.

While I have shown only the preferred form of my invention, it should be understood that various changes or modifications may be made within the scope of the appended claims without departing from the spirit and scope of the invention.

In carrying out my invention, I make use of a trailer body indicated generally at A that is provided with a tongue B, see Figures 3, 4 and 5. My device is illustrated in Figures 1 and 2 and is secured to the trailer body by brackets or axle assembly angles C. The brackets have openings 1 through which bolts or rivets (not shown), are inserted for permanently connecting the brackets to the body A. Figure 2 shows a tubular bearing shell 2 extending through the vertical portion of each bracket and being welded to the bracket at 3.

Within each shell 2 I mount a bearing indicated generally at D and they are preferably made of bronze. An axle tube E is rotatably mounted in the right hand bearing D shown in Figure 3, and an axle tube E' is rotatably mounted in the left hand bearing. The tube E is held from longitudinal movement in the bearing D and the right hand shell 2 by axle-retaining rings 4. These rings are disposed at each end of the shell 2 and are welded to the tube E. In like manner, axle-retaining rings 4' are disposed at each end of the shell 2' for preventing longitudinal movement of the tube E' in the left hand bearing and the rings are welded or otherwise secured to the tube.

The inner end 5 of tube E is spaced from the inner end 5' of tube E' as clearly shown in both Figures 2 and 3. Between the adjacent tube ends 5 and 5', I rotatably mount a torque axle bearing block or member indicated generally at F. The member has a bore 6 extending therethrough and has a central enlargement 7 that lies between the tube ends 5 and 5'. The outer surface of the enlargement 7 is cylindrical in shape and the member F has integral extensions 8 and 8' that project into the tubes E and E' respectively. Bushings 9 and 9' are mounted on the extensions 8 and 8' and are received in the tubes E and E'. The member F coacts with the tubes E and E' to make one elongated axle that extends between the sides of the trailer and in which each tube section E and E' is free to rotate independently of the other.

The bore 6 of the member F receives an axle overload torque spring or member G, see Figure 3. The inner end of the torque member G is welded or otherwise secured to the torque axle bearing member F, and the outer end extends through an opening 10 in a wheel spindle crank arm H. The opening 10 permits the torque member G to freely rotate therein. The portion of the torque member projecting beyond the crank arm H is rigidly connected to an overload spring anchor J. The anchor is shown welded to the outer end of the torque member G in Figure 2, and the other end of the anchor is connected by bolts J' or other suitable fastening means, to the bracket C.

There are two crank arms, the arm H being welded or otherwise permanently secured to the tube E and the crank arm H' being secured to the outer end of the tube E'. Each arm carries a wheel-supporting spindle 11 at its outer end and a wheel K is mounted on each spindle. A novel torsional helical spring indicated generally at L connects the tubes E and E' to the torque axle bearing member F. The torsional spring has two coiled portions 12 and 12' interconnected by an elongated portion 13. The torsional spring L also has an end 14 that is received in a lug 15 that is secured to the tube E, and has an end 14' that is received in a lug 15' that is secured to the tube E'. The central elongated portion 13 is received in a lug 16 that is secured to the torque axle bearing member F.

The structure is such that each wheel has an independent spring support, the wheel connected to the right hand spindle in Figure 3 having the coil 12 acting as its independent spring support while the wheel connected to the left hand spindle has the coil 12' as its independent spring support. Each coil will carry a predetermined load before causing the member F to start to rotate and twist the overload torque member G. In other words, each wheel will have an independent spring support up to a certain load and when this load is exceeded, then the axle overload torque member will come into play and will resiliently support the additional load. The common overload torque distribution rod acts when either wheel is moved beyond a certain point and loads the coil 12 or 12' to its maximum.

Each tube E and E' can rotate independently of the other and therefore a separate knee action effect will be provided for each wheel. The brackets C when connected to the trailer body will prevent relative axial movement between the tubes E and E'. However, when it is desired to ship the device independently of the trailer, the tube E' and its associate parts can be slipped off from the extension 8' of the torque axle bearing member F. The spring end 14' will slide out from the lug 15' during the removal of the tube E'. The device can therefore be shipped in two main parts. All parts of the device are made from standard tubular parts and are fabricated by electric arc welding.

In Figures 3, 4 and 5, I illustrate how the trailer body can be raised or lowered with respect to the ground. The vertical portion 17 of the right hand body bracket C has a plurality of two or more openings 18 in each row that extend radially from the axis of the tube E. Three such radial rows of openings are indicated in the drawings. The overload spring anchor J may be swung from the horizontal position shown in Figure 3 into an upwardly inclined position shown in Figure 4. To accomplish this the bolts J' that secure the anchor J to the bracket C are removed and then the anchor is swung into an upwardly inclined position whereupon the bolts are reinserted in the openings in the anchor and in the new set of openings 18 in the bracket which are now in alignment with the anchor openings.

Such movement of the anchor J will impart a rotational movement to the axle overload torque member G and a similar movement to the torque axle bearing member F. Also, the rotation of the member F into its new position will impart a similar rotation to the torsional spring L, the tubes E and E' and the crank arms H. The arms H will be swung the same distance the anchor J is swung so as to be in alignment therewith. The trailer body will be supported at a lower distance from the ground than that shown in Figure 3.

The opposite is true when the anchor J is inclined downwardly so as to bring the spindles 11 on the crank arms H to a lower position with respect to the trailer body A. In this case the trailer body will be moved away from the ground, see Figure 5. It will further be noted that as the crank arms H are swung from a horizontal position toward a vertical position so as to place the spindles 11 either above or below the tube E, a greater load can be carried before the torsional spring L will become active because the crank arm is nearer a vertical position. The effectiveness of the torsional spring will be at its best when the overload spring anchor J is disposed in a horizontal position as shown in Figure 3.

Raising the trailer body to a higher level than that shown in Figure 3, will adapt it to travel over ground on which brush is growing. When the trailer is lowered below normal level, it can be loaded more readily. Furthermore, the lowering of the trailer will increase the force exerted by the coil spring portions so heavier loads can be carried.

I claim:

1. The combination with a vehicle body, of an axle therefor consisting of two aligned and independently rotatable tubular members, a wheel-supporting crank arm rigidly connected to each member, a wheel mounted on each arm, each wheel when moving over uneven ground causing its crank arm to rotate said tubular member, a torsional spring having two coiled portions spaced from a common central portion, the coils being telescoped over said members with each coil being connected to its member so as to resiliently support the wheel connected to the member, a torque member mounted in the tubular members and having one end connected to the central portion of the torsional spring, and means connecting the other end of said torque member to the body.

2. The combination with a vehicle body, of an axle therefor consisting of two aligned and independently rotatable tubular members, a wheel-supporting crank arm rigidly connected to each member, a wheel mounted on each arm, each wheel when moving over uneven ground causing its crank arm to rotate said tubular member, a torsional spring having two coiled portions spaced from a common central portion, the coils being telescoped over said members with each coil being connected to its member so as to resiliently support the wheel connected to the member, a torque member mounted in the tubular members and having one end connected to the central portion of the torsional spring, means connecting the other end of said torque member to the body, said last-named means being adjustably connected to the body for rotating the torque member into the desired angular position and for securing the said other end of the torque member in this position.

3. A device of the type described comprising a pair of aligned tubular members constituting the axle of a vehicle, a combined bearing member and spring support placed between the adjacent ends of the members and having cylindrical extensions rotatably mounted in the tubular members, wheel-supporting arms rigidly secured to the outer ends of the tubular members, a torsional spring having a central portion connected to said spring support and having two coiled portions, one being telescoped over each tubular member and connected therewith, whereby a swinging movement of either arm will be resiliently supported by the coil portion operatively connected to the arm, and means for anchoring the combined bearing member and spring support.

4. A device of the type described comprising a pair of aligned tubular members constituting the axle of a vehicle, a combined bearing member and spring support placed between the adjacent ends of the members and having cylindrical extensions rotatably mounted in the tubular members, wheel-supporting arms rigidly secured to the outer ends of the tubular members, a torsional spring having a central portion connected to said spring support and having two coiled portions, one being telescoped over each tubular member and connected therewith, whereby a swinging movement of either arm will be resiliently supported by the coil portion operatively connected to the arm, means for anchoring the combined bearing member and spring support, said last-named means including an axle overload torque member mounted in one of the tubular members and having one end connected to the combined bearing member and spring support, said torque member projecting beyond the tubular member in which it is mounted, and an anchor member secured to the projecting end of the torque member and adapted to be secured to the body of a vehicle to which the device is attached.

5. In a device of the type described, an axle composed of two tubular members, a torque axle bearing member placed between the tubular members and having cylindrical portions removably received in each, wheel-supporting arms secured to the outer ends of the tubular members, a torsional spring having a central portion connected to the torque axle bearing member and two coiled portions, one being telescoped over each tubular member and removably connected thereto, whereby one tubular member may be disconnected from the torque axle bearing member and the coiled portion of the spring to permit the device to be disassembled.

PATRICK M. MORROW.

REFERENCES CITED

The following references are of record in the file of this patent:

UNITED STATES PATENTS

| Number | Name | Date |
|---|---|---|
| 2,455,787 | Linn | Dec. 7, 1948 |

FOREIGN PATENTS

| Number | Country | Date |
|---|---|---|
| 812,732 | France | May 15, 1937 |